(12) United States Patent
Lee et al.

(10) Patent No.: US 11,198,617 B2
(45) Date of Patent: Dec. 14, 2021

(54) AMORPHOUS COMPOSITE METAL OXIDE AND PREPARATION METHOD THEREFOR

(71) Applicant: PUSAN NATIONAL UNIVERSITY INDUSTRY-UNIVERSITY COOPERRATION FOUNDATION, Busan (KR)

(72) Inventors: Hee Soo Lee, Busan (KR); Seung Hyeon Jo, Busan (KR); Seol Jeon, Gimhae (KR); Bu Young Kim, Gimhae (KR); Ji Seung Ryu, Busan (KR); Hyun Park, Busan (KR); Soon Ok Kim, Changwon (KR); Hyun Jo Yoo, Busan (KR); Hwan Ho Jeon, Busan (KR)

(73) Assignee: PUSAN NATIONAL UNIVERSITY INDUSTRY-UNIVERSITY COOPERRATION FOUNDATION, Busan (KR)

( * ) Notice: Subject to any disclaimer, the term of this patent is extended or adjusted under 35 U.S.C. 154(b) by 0 days.

(21) Appl. No.: 16/327,763

(22) PCT Filed: Aug. 24, 2017

(86) PCT No.: PCT/KR2017/009276
§ 371 (c)(1),
(2) Date: Feb. 22, 2019

(87) PCT Pub. No.: WO2018/038560
PCT Pub. Date: Mar. 1, 2018

(65) Prior Publication Data
US 2019/0210889 A1 Jul. 11, 2019

(30) Foreign Application Priority Data
Aug. 24, 2016 (KR) .................. 10-2016-0107497

(51) Int. Cl.
B01J 21/06 (2006.01)
B01J 23/00 (2006.01)
(Continued)

(52) U.S. Cl.
CPC .............. *C01G 25/02* (2013.01); *B01J 21/06* (2013.01); *B01J 23/002* (2013.01); *B01J 23/10* (2013.01);
(Continued)

(58) Field of Classification Search
CPC ...... B01J 21/063; B01J 21/066; B01J 23/002; B01J 23/10; C01G 23/04; C01G 23/047;
(Continued)

(56) References Cited

U.S. PATENT DOCUMENTS 4,663,305 A * 5/1987 Mauldin .................. B01J 23/75
502/304
5,571,492 A * 11/1996 Yao .......................... B01J 20/06
423/263

(Continued)

FOREIGN PATENT DOCUMENTS

KR 10-2013-0139757 12/2013

OTHER PUBLICATIONS

Henych et al. "Degradation of Trimethyl Phospate on TiZrCe Mixed Oxides" 2014 3$^{rd}$ International Conference on Environment, Chemistry and Biology, IACSIT Press, 2014; 78: 41-45.
(Continued)

*Primary Examiner* — Cam N. Nguyen
(74) *Attorney, Agent, or Firm* — Norton Rose Fulbright US LLP (57) ABSTRACT

In an amorphous complex metal oxide and a method for producing the same of the present disclosure, the amorphous complex metal oxide is a three-components metal oxide
(Continued)

containing titanium (Ti), cerium (Ce), and zirconium (Zr), wherein the amorphous complex metal oxide is amorphous.

4 Claims, 5 Drawing Sheets

(51) Int. Cl.
| | |
|---|---|
| *B01J 23/10* | (2006.01) |
| *C01G 25/02* | (2006.01) |
| *C01G 1/02* | (2006.01) |
| *C01G 23/04* | (2006.01) |
| *C01G 23/047* | (2006.01) |
| *C01G 23/053* | (2006.01) |
| *C01G 23/08* | (2006.01) |
| *C01G 23/00* | (2006.01) |
| *F01N 3/20* | (2006.01) |

(52) U.S. Cl.
CPC ............... *C01G 1/02* (2013.01); *C01G 23/00* (2013.01); *B01J 2523/3712* (2013.01); *B01J 2523/47* (2013.01); *B01J 2523/48* (2013.01); *C01P 2002/02* (2013.01); *C01P 2002/72* (2013.01); *C01P 2004/04* (2013.01); *F01N 3/2066* (2013.01)

(58) Field of Classification Search
CPC ...... C01G 23/053; C01G 23/08; C01G 25/02; C01G 1/02
USPC .......................................... 502/304, 349, 350
See application file for complete search history.

(56) References Cited

U.S. PATENT DOCUMENTS

| | | | | |
|---|---|---|---|---|
| 5,580,536 | A * | 12/1996 | Yao | B01J 23/10 264/614 |
| 5,582,785 | A * | 12/1996 | Yao | B01J 23/10 264/118 |
| 6,150,299 | A * | 11/2000 | Umemoto | B01J 23/10 423/213.2 |
| 7,485,599 | B2 * | 2/2009 | Muhammed | B01J 37/03 502/304 |
| 7,871,957 | B2 | 1/2011 | Willigan et al. | |
| 8,617,502 | B2 * | 12/2013 | Augustine | B01J 37/0215 423/239.1 |
| 9,249,264 | B2 * | 2/2016 | DeLuca | C09D 7/63 |
| 9,309,166 | B2 * | 4/2016 | Visagie | B01J 21/08 |
| 9,527,782 | B2 * | 12/2016 | Meyer | B01J 37/033 |
| 2005/0227864 | A1 * | 10/2005 | Sutorik | C01F 7/304 502/304 |
| 2006/0025301 | A1 * | 2/2006 | Reddy | B01J 23/10 502/304 |
| 2006/0052243 | A1 * | 3/2006 | Muhammed | C01F 17/32 502/304 |
| 2007/0179053 | A1 * | 8/2007 | Lee | B01J 37/036 502/304 |

OTHER PUBLICATIONS

International Search Report and Written Opinion issued in Application No. PCT/KR2017/009276, filed Nov. 13, 2017.
Lin et al. "Preparation of $ZrO_2$—$TiO_2$—$CeO_2$ and Its Application in the Selective Catalytic Reduction of NO and $NH_3$" *Acta Physico-Chimica Sinica*, 2007; 23(12): 1851-1856.
Xu et al. "Promotional Effects of Zr on K+-poisoning Resistance of $CeTiO_x$ Catalyst for Selective Catalytic Reduction of NOx with $NH_3$" *Chinese Journal of Catalysis*, 2016; 37(8): 1354-1361.

* cited by examiner

AMORPHOUS COMPOSITE METAL OXIDE AND PREPARATION METHOD THEREFOR

This application is a national phase application under 35 U.S.C. § 371 of International Application No. PCT/KR2017/009276, filed Aug. 24, 2017, which claims priority to Korean Patent Application No. 10-2016-0107497, filed Aug. 24, 2016. The referenced applications are incorporated into the present application by reference.

FIELD OF THE INVENTION

The present disclosure relates to an amorphous complex metal oxide and a method for producing the same.

BACKGROUND

Cerium oxide (ceria) is used in various fields such as a catalyst, a fuel cell, a coating, a gas sensor, an oxygen membrane, and the like. The cerium oxide (ceria) plays an important role as an enhancer in catalysts such as three-way catalysts (TWCs), and in a selective catalytic reduction. An oxidation and a reduction ($Ce^{3+} \leftrightarrow Ce^{4+}$) occur easily in the cerium oxide such that an oxygen is reversibly bound to or eliminated from the cerium oxide. This is called an oxygen storage capacity of the cerium oxide.

Since the cerium oxide has a low stability at high temperatures, a grain growth of a crystal thereof may occur excessively during a producing process or during use as the catalyst. When an aggregation occurs in the cerium oxide due to its low thermal stability, an active surface area of the catalyst is drastically reduced. Therefore, there is a problem that a catalyst performance is deteriorated. For this reason, cerium is mostly used as the enhancer to improve the catalyst performance together with a main catalyst rather than as a single component-based catalyst.

Further, titanium oxide is the most widely used as a catalyst carrier for carrying an active substance. One of the important factors of the catalyst carrier is a specific surface area. A research for a flower-shape or a needle-shape to broaden the specific surface area has been conducted. Although it is known that an amorphous compound may significantly improve the specific surface area, a crystallized titanium oxide rather than an amorphous titanium oxide is used as the catalyst carrier due to a low crystallization temperature of the titanium oxide. Thus, there is a limit for broadening the specific surface area.

SUMMARY OF THE INVENTION

A purpose of the present disclosure is to provide an amorphous complex metal oxide that has a maximized specific surface area and an increased activity.

Another purpose of the present disclosure is to provide a method for producing the amorphous complex metal oxide easily in a simple manner.

In one aspect, there is provided an amorphous complex metal oxide including a three-components metal oxide containing titanium (Ti), cerium (Ce), and zirconium (Zr), wherein the three-components metal oxide is amorphous.

In one embodiment, the three-components metal oxide may be a selective catalytic reduction (SCR) catalyst.

In one embodiment, the three-components metal oxide may reduce nitrogen oxide.

In another aspect, there is provided a method for producing an amorphous complex metal oxide including: preparing a titanium precursor solution having titanium precursors dispersed therein; adding a cerium precursor and a zirconium precursor into the titanium precursor solution to form a complex metal precursor solution; adding an alkaline solution into the complex metal precursor solution to form a product via a reaction between the complex metal precursor solution and the alkaline solution; and heat-treating the product at 500° C. to 600° C. to form amorphous three-components metal oxide containing titanium (Ti), cerium (Ce), and zirconium (Zr).

In one embodiment, the addition of the alkaline solution may include adding the alkaline solution to adjust an acidity (pH) of the complex metal oxide precursor solution to 9 to 11.

In one embodiment, the method may further include drying the product at 70° C. to 90 ° C. before the heat-treatment of the product at 500° C. to 600° C.

According to the above described amorphous complex metal oxide and the method for producing the same of the present disclosure, the amorphous complex metal oxide, which is the metal oxide containing titanium, and is amorphous may be provided. This amorphous complex metal oxide has a very good specific surface area, thereby maximizing the catalytic activity when used as the catalyst.

DETAILED DESCRIPTION OF THE INVENTION

Hereinafter, the terminology used in the present application is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," "comprising,"

"includes," and "including," when used in the present application, specify the presence of the stated features, steps, operations, elements, components, and/or combinations thereof, but do not preclude the presence or addition of one or more other features, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An amorphous complex metal oxide according to the present disclosure is a three-components metal oxide containing three types of metals of titanium (Ti), cerium (Ce) and zirconium (Zr), and is amorphous. The amorphous complex metal oxide according to the present disclosure may be represented by $Ti_aCe_bZr_cO_x$. In this connection, a, b, and c respectively and independently represent values of more than 0 but 1 or less. When a total number of entire metal atoms contained in the amorphous complex metal oxide is 1, a, b and c respectively represent ratios of the respective titanium, cerium, and zirconium. In addition, x represents a value of 0 or more.

As used herein, the term "amorphous" defines, like the general dictionary meaning, a substance in an amorphous state. Thus, although the amorphous complex metal oxide has a uniform composition, the amorphous complex metal oxide is amorphous in that an atomic arrangement of the titanium, the cerium, and the zirconium thereof is not in a crystal state, is disordered in a similar manner to liquid, and does not form a lattice.

Generally, since titanium oxides have a low crystallization temperature, most of the titanium oxides are crystallized into titanium dioxides ($TiO_2$) during a synthesis of oxides containing the titanium. However, in the present disclosure, a complex metal oxide is overall amorphous, despite being the complex metal oxide containing the titanium. The amorphous complex metal oxide according to the present disclosure is used as a selective catalytic reduction catalyst for reducing a nitrogen oxide, and has a high catalytic activity because it is amorphous. For a production of the amorphous complex metal oxide according to the present disclosure, a titanium precursor solution is first produced using a titanium precursor.

In this connection, titanium isopropoxide (TTIP) may be used as the titanium precursor. The titanium precursor solution includes the titanium precursor and a solvent. As the solvent, ethanol may be used, and the titanium precursor solution may be prepared by mixing the titanium precursor and the ethanol at a volume ratio of 1:5. Nuclei for production of the amorphous complex metal oxides may be produced by mixing the titanium precursor with the ethanol. This titanium precursor solution may be prepared at a room temperature.

Next, a complex metal oxide precursor solution is produced by adding and mixing a cerium precursor and a zirconium precursor to the titanium precursor solution. Cerium (III) nitrate hexahydrate may be used as the cerium oxide precursor, and zirconium (IV) oxynitrate hydrate ($ZrO(NO_3)_2 \cdot xH_2O$) may be used as the zirconium oxide precursor.

Before mixing the cerium precursor and the zirconium precursor into the titanium precursor solution, in order to prevent aggregation between the titanium precursor and a solvent, a dispersant may be added to maintain a stable dispersion state.

An alkaline solution is added to the complex metal oxide precursor solution produced by mixing the cerium precursor and the zirconium precursor into the titanium precursor solution to adjust an acidity (pH) of the complex metal oxide precursor solution to 9 to 11. Due to this acidity adjusting process, the cerium precursor and the zirconium precursor may be stably and uniformly dispersed on a surface of the titanium precursor. However, it is preferable that the addition of the alkaline solution is performed slowly to prevent the acidity of the complex metal oxide precursor from increasing rapidly.

Subsequently, the complex metal oxide precursor solution having the acidity of 9 to 11 is agitated for a sufficient time, allowed to be held at a room temperature to obtain a product. Then, the product is heat-treated at 500° C. to 600° C.

The product may be filtered and washed before the heat-treatment process, and the filtered product, which is in a solid state may be washed with distilled water. A drying process for removing a moisture contained in the washed solid-state product may be further performed. The drying process may be performed at 70° C. to 90° C.

Due to the heat-treatment, the complex metal oxide containing the titanium, the cerium, and the zirconium is formed, and the complex metal oxide becomes amorphous. In the heat-treatment process, a material diffusion occurs between the titanium, the cerium, and the zirconium. However, instead of a crystallization between a metal and an oxygen, hetero atoms of the titanium, the cerium, and the zirconium may be sequentially ordered in some regions, and at the same time, may be randomly distributed in other regions to form the amorphous complex metal oxide.

Based on the above description, although the heat-treatment process is performed at the temperature of 500° C. or higher, an amorphous three-components metal oxide containing the titanium, the cerium, and the zirconium may be formed without a formation of a lattice structure such as titanium dioxide ($TiO_2$), cerium oxide ($CeO_2$) or zirconium oxide ($ZrO_2$).

Hereinafter, the present disclosure will be described in more detail through a specific Production Example and Comparative Examples and analysis results thereof.

Production Example 1: Preparation of Amorphous Complex Metal Oxide

TTIP was prepared as a titanium precursor, mixed with ethanol, and agitated for 30 minutes to prepare a titanium precursor solution. In this connection, a mixing volume ratio of the TTIP and the ethanol was 1:5.

The titanium precursor solution was mixed with distilled water and a dispersant, and agitated for 30 minutes. The distilled water was added in an amount corresponding to 5 times a volume of the titanium precursor solution, and 1.5 mL of the dispersant was mixed.

Next, cerium (III) nitrate hexahydrate and zirconium (IV) oxynitrate hydrate ($ZrO(NO_3)_2 \cdot xH_2O$) was simultaneously mixed with the titanium precursor solution to which the dispersant was added to prepare a complex metal oxide precursor solution.

28% ammonia solution was added to the complex metal oxide precursor solution. The ammonia solution was added until an acidity of the complex metal oxide precursor solution was 10. The complex metal oxide precursor solution to which the ammonia solution was added was agitated for 6 hours, then an agitator was stopped, and the complex metal oxide precursor solution was left at a room temperature for 12 hours.

Subsequently, a product was filtered using a vacuum pump and a paper filter, and the obtained filtered product was sufficiently washed with distilled water, then was dried in a dryer at 80° C. for 24 hours.

An obtained solid was heat-treated at 550° C. for 6 hours in an air atmosphere to obtain a sample 1 ($Ce_{0.2}Zr_{0.1}Ti_{0.7}O_x$) as a final product according to an embodiment 1 of the present disclosure.

Structure Analysis: Check Whether Amorphous

An X-ray diffraction analysis (XRD), a transmission electron microscopy (TEM)/an energy dispersive spectroscopy analysis (EDS), and a high-resolution TEM analysis were performed on the sample 1 produced according to Production Example 1 as described above. Results are shown in FIG. 1 to FIG. 3.

Figure 1:
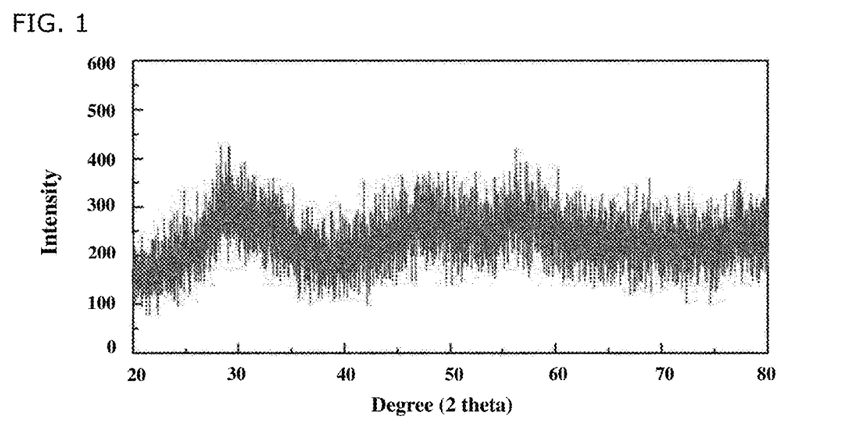
FIG. 1 is a graph showing an X-ray diffraction analysis result of a sample 1, which is an amorphous complex metal oxide produced according to Production Example 1 of the present disclosure.

FIG. 1 is a graph showing an X-ray diffraction analysis result of a sample 1, which is an amorphous complex metal oxide produced according to Production Example 1 of the present disclosure. FIG. 2 shows TEM-EDS mapping analysis photographs of a sample 1 according to the present disclosure. Further, FIG. 3 shows high-resolution TEM photographs of a sample 1 according to the present disclosure.

With reference to FIG. 1, it may be seen that a broad pattern appears in a diffraction angle (2θ) range of 20° to 80° with no peak having a particularly strong intensity. That is, through this, it may be seen that the sample 1 according to the present disclosure is amorphous without having a crystallinity.

Figure 2:
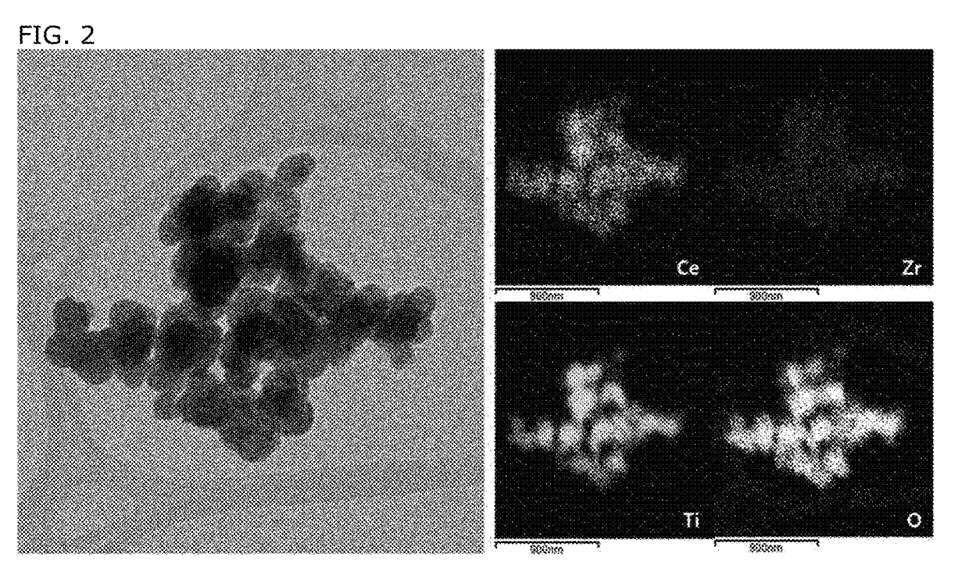
FIG. 2 shows TEM-EDS mapping analysis photographs of a sample 1 according to the present disclosure.
Figure 3:
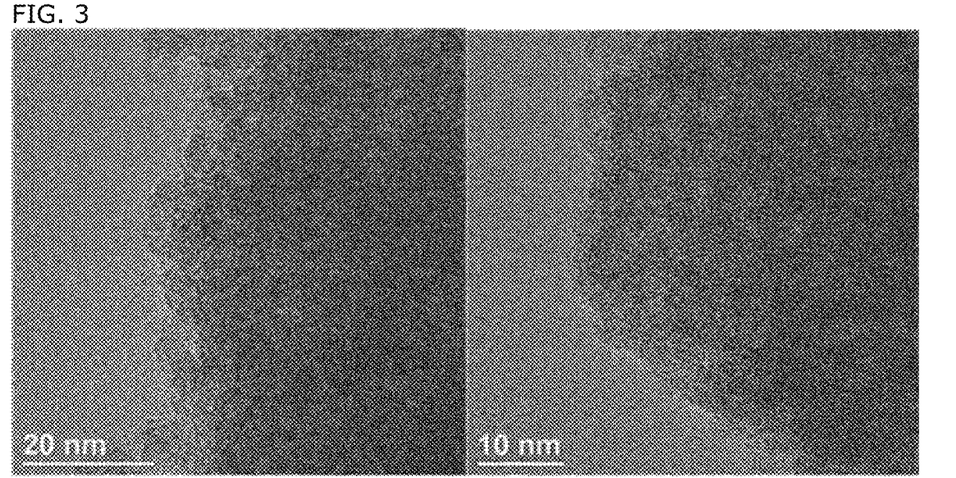
FIG. 3 shows high-resolution TEM photographs of a sample 1 according to the present disclosure.

With reference to FIG. 2, it may be seen with comparison between the sample 1 as shown in a left TEM photograph and the sample 1 in a right EDS mapping photograph element-mapped to the TEM photograph, that the sample 1 contains cerium, zirconium, titanium, and oxygen atoms. In addition, it may be seen that the cerium, the zirconium, the titanium, and the oxygen atoms are uniformly distributed throughout the sample 1.

In FIG. 3, a left photograph is a high-resolution TEM photograph in a 20 nm scale, and a right photograph is a high-resolution TEM photograph in a 10 nm scale. The XRD pattern shown in FIG. 1 has a limitation in determining whether or not a crystalline phase having a size of 10 nm or smaller exists. Therefore, in order to determine more clearly whether the sample 1 is amorphous, the high-resolution TEM photographs were taken as shown in FIG. 3. However, the presence of the nano-sized crystal phase may not be confirmed using the high resolution TEM photograph. Thus, it may be confirmed that there is substantially absent the nano-scale crystal phase.

Preparation of Comparative Oxide 1 and Determination of Crystallinity

Except for omitting the zirconium precursor, a comparative oxide 1 ($CeTiO_x$) according to Comparative Example 1 was prepared in substantially the same manner as in the sample 1.

In order to determine the crystallinity of the comparative oxide 1, TEM photographs of 10 nm scale were taken. Results are shown in FIG. 4.

Figure 4:
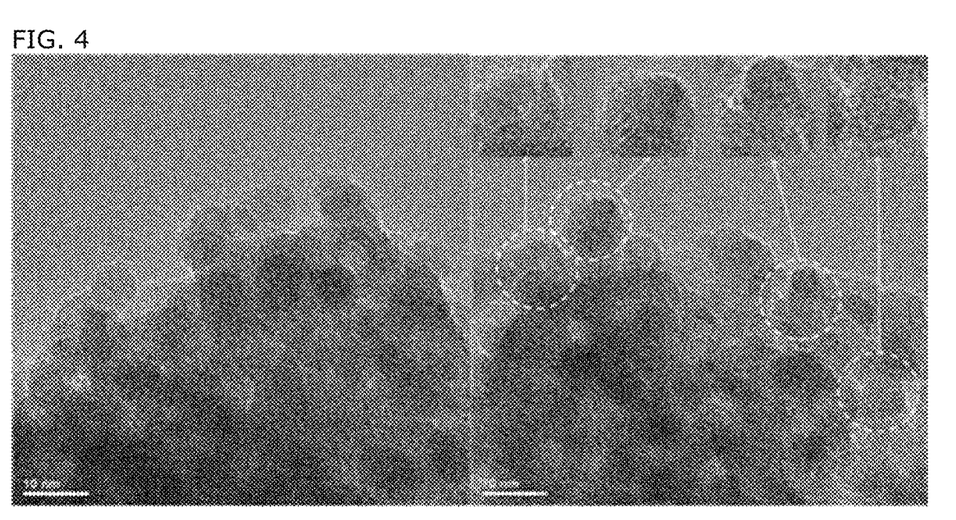
FIG. 4 is TEM photographs of a comparative oxide 1 ($CeTiO_x$) according to Comparative Example 1.

FIG. 4 is TEM photographs of a comparative oxide 1 ($CeTiO_x$) according to Comparative Example 1.

With reference to FIG. 4, it may be seen that, in a case of the comparative oxide 1, which does not contain the zirconium, crystals having a size of 3 nm to 5 nm are formed. It may be seen from comparing FIG. 4 with the high-resolution TEM photographs of the sample 1 shown in FIG. 3 that ring-shaped diffraction patterns appear in FIG. 4. This may indicate that Unlike FIG. 3, in which the amorphous state occurs as shown in an overall cloudy state, the crystals are formed in FIG. 4 in which the zirconium precursor is not employed.

Preparation and Structural Analysis of Comparative Oxide 2

The reaction described above occurred using the TTIP as the titanium precursor without using the zirconium precursor and the cerium precursor to produce a product. The product was then heat-treated at 550° C. As a result, a comparative oxide 2 according to Comparative Example 2 was obtained. A production process of the comparative oxide 2 was performed substantially the same as the production process of the sample 1, except that the zirconium precursor and the cerium precursor were not used.

Figure 5:
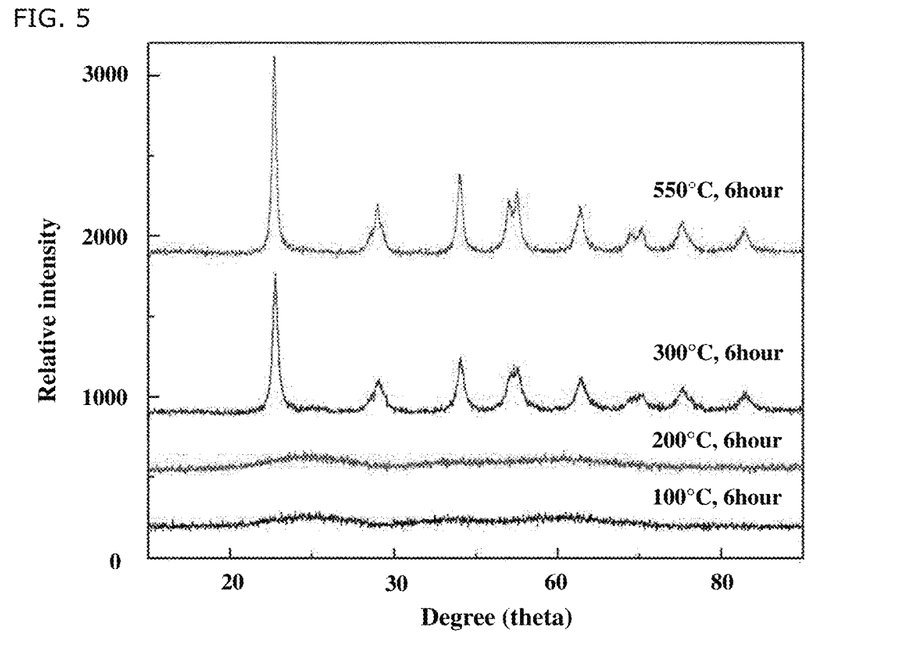
FIG. 5 is a graph showing an X-ray diffraction analysis result for a determination of a crystallinity of a comparative oxide 2 ($TiO_2$) according to Comparative Example 2.

The XRD analysis was performed for the produced comparative oxide 2, and a result was shown in FIG. 5.

FIG. 5 is a graph showing an X-ray diffraction analysis result for a determination of a crystallinity of a comparative oxide 2 ($TiO_2$) according to Comparative Example 2.

With reference to FIG. 5, a graph labeled "550° C., 6 hour" relates to an XRD pattern of the comparative oxide 2, showing that there are diffraction peaks with high intensities at 8 diffraction angles. The existence of such a diffraction peaks suggests that titanium oxide ($TiO_2$), which has a crystallinity is produced in the comparative oxide 2. It may be seen that when the comparative oxide 2 is heat-treated at 100° C. and 200° C., the comparative oxide 2 is amorphous, whereas when the comparative oxide 2 is heat-treated at 300° C., a crystallization starts to occur. That is, it may be confirmed that, when the comparative oxide 2 is heat-treated at 550° C. only using the titanium precursor, the titanium oxide having the crystallinity rather than amorphous is formed.

Preparation and Structural Analysis of Comparative Oxide 3 and 4

Comparative oxide 3 was produced by performing substantially the same as the production process of the sample 1. However, the comparative oxide 3 was heat-treated at 550° C. with only the cerium precursor except the zirconium precursor and the titanium precursor.

In addition, Comparative oxide 4 was produced by performing substantially the same as the production process of the sample 1. However, the comparative oxide 4 was heat-treated at 550° C. with the cerium precursor and the zirconium precursor except the titanium precursor.

The XRD analyses were performed for the respective structural analyses of the comparative oxide 3 and 4. Results are shown in FIG. 6.

Figure 6:
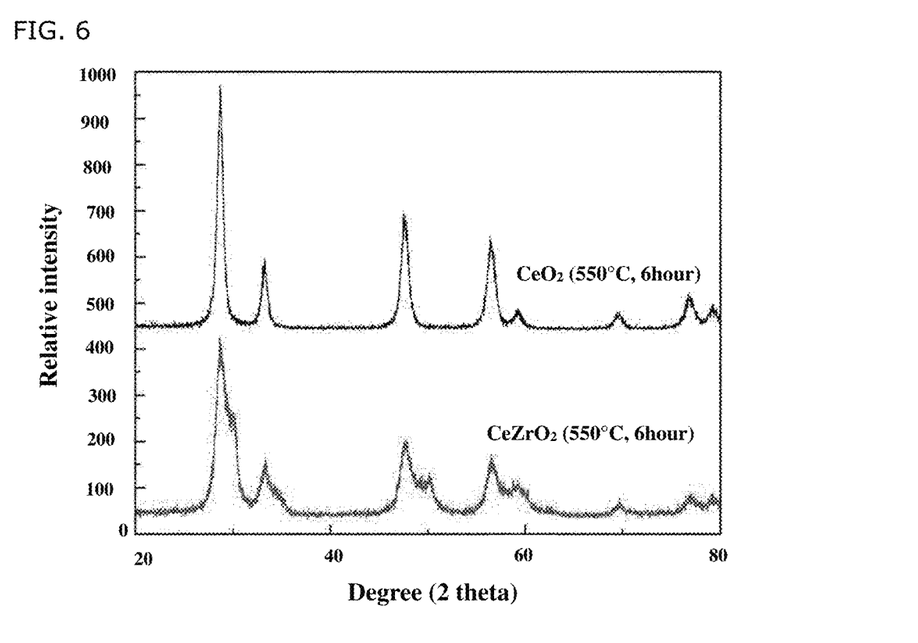
FIG. 6 is a graph showing X-ray diffraction analyses for determinations of crystallinity of a comparative oxide 3 ($CeO_2$) according to Comparative Example 3 and a comparative oxide 4 ($CeZrO_2$) according to Comparative Example 4.

FIG. 6 is a graph showing X-ray diffraction analyses for determinations of a comparative oxide 3 ($CeO_2$) according to Comparative Example 3 and a comparative oxide 4 ($CeZrO_2$) according to Comparative Example 4.

With reference to FIG. 6, It may be seen that the comparative oxide 3 and the comparative oxide 4 respectively have a crystallinity showing diffraction peaks at specific diffraction angles. That is, even though the complex metal oxide is formed only with the cerium precursor and the zirconium precursor without the titanium precursor, the crystallization occurs at 550° C.

Performance Evaluation of Selective Catalytic Reduction Catalyst

Figure 7:
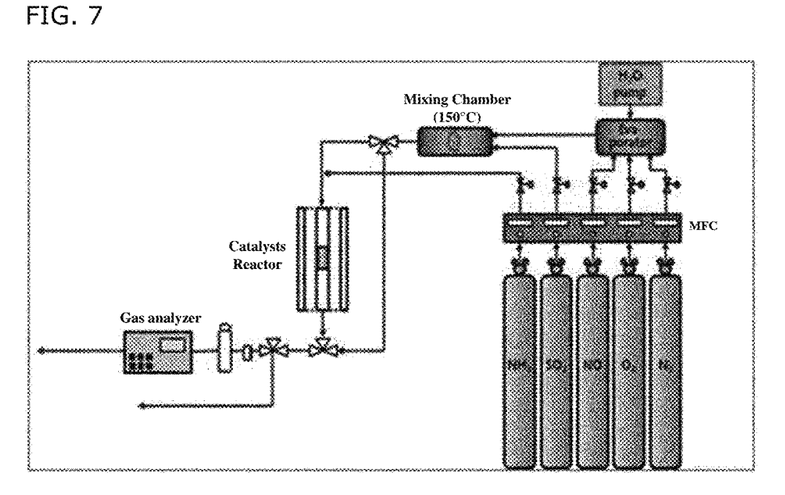
FIG. 7 illustrates a fixed-bed flow reactor used for evaluating a selective catalytic reduction catalyst performance of a sample 1 according to the present disclosure.

In order to evaluate a selective catalytic reduction catalyst performance of nitrogen oxide for the sample 1, a fixed-bed flow reactor as shown in FIG. 7 was prepared. Then, a removal efficiency of the nitrogen oxide based on a temperature was measured using the fixed-bed flow reactor. NO, $NH_3$, $O_2$, and $N_2$ were used as reaction gases. In addition, input ratios (concentrations) of the reaction gases were 1000 ppm NO, 1000 ppm $NH_3$, and 5 vol. % $O_2$. Further, nitrogen ($N_2$) was used as a balance gas (to flow a gas that has no reactivity for adjusting the total gas flow). In this connection, a total gas flow velocity was 10,000 $h^{-1}$ (Gas Hourly Space Velocity, GHSV). The sample 1, a reaction catalyst, was used in a form of a solid powder. In order to stabilize the reaction of the catalyst, the catalyst was maintained 1 hour at 100° C., 30 minutes or more at 150° C., 200° C., 250° C., and 300° C. Then, an efficiency of the catalyst was measured. Results are shown in FIG. 8.

FIG. 7 illustrates a fixed-bed flow reactor used for evaluating a selective catalytic reduction catalyst performance of a sample 1 according to the present disclosure. Further, FIG. 8 is a graph showing a change of a removal efficiency of nitrogen oxide based on a temperature of a sample 1 of the present disclosure.

Figure 8:
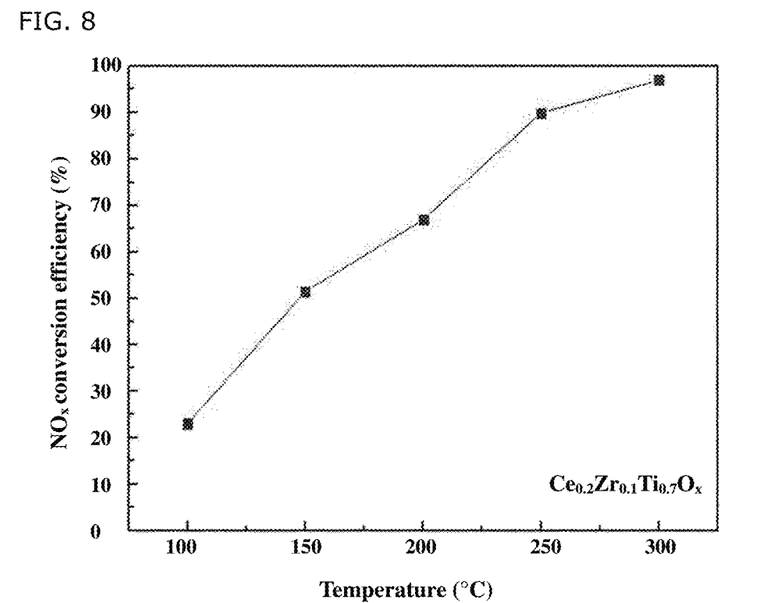
FIG. 8 is a graph showing a change of a removal efficiency of nitrogen oxide based on a temperature of a sample 1 of the present disclosure.

With reference to FIG. 8, it may be confirmed that the nitrogen oxide removal efficiency is 22.98% at 100° C., 51.55% at 150° C., 66.96% at 200° C., 89.97% at 250° C., and 96.95% at 300° C. That is, it may be confirmed that the amorphous complex metal oxide of the sample 1 has a high efficiency as the selective catalytic reduction catalyst (SCR catalyst) through this.

Structure Analysis of Sample 1 and Result Thereof

A spectroscopic analysis was performed for the sample 1 using a radiation analyzer of the Pohang Accelerator Center, and X-ray absorption spectroscopic analysis data was obtained. Results are shown in FIG. 9.

Figure 9:
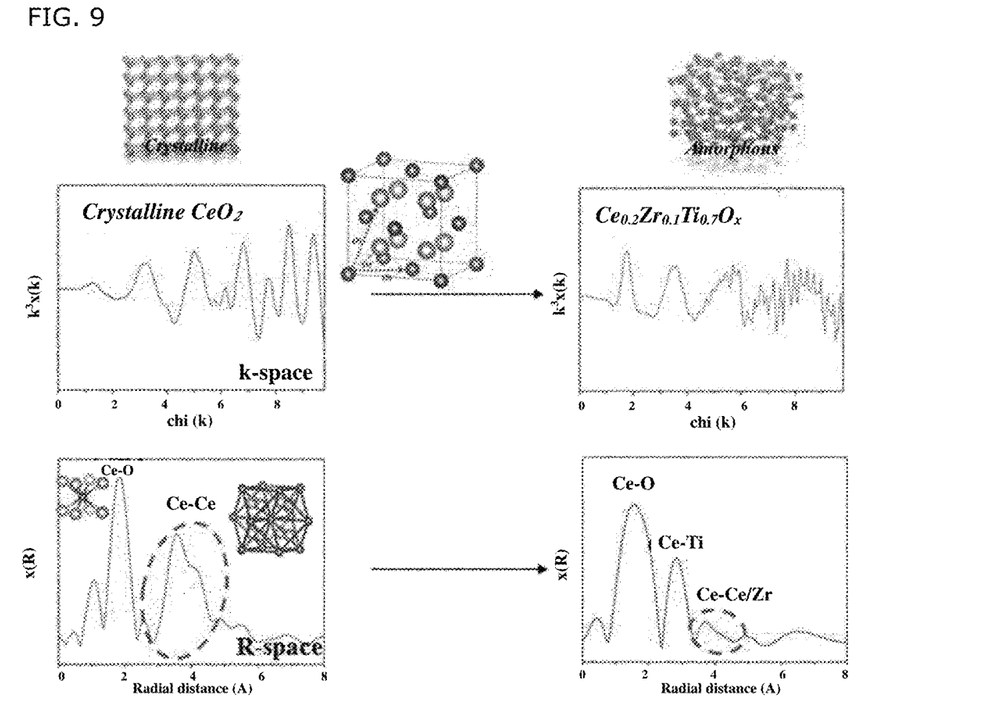
FIG. 9 shows k-space and R-space data of a comparative oxide 3 ($CeO_2$) according to Comparative Example 3 and a sample 1 of the present disclosure.

FIG. 9 shows k-space and R-space data of a comparative oxide 3 ($CeO_2$) according to Comparative Example 3 and a sample 1 of the present disclosure.

An X-ray absorption spectroscopic analysis may be used for analyzing data obtained for an L3-edge of the cerium to determine locations of atoms actually bonded around a cerium atom. The X-ray absorption spectroscopic analysis is referred to as an "Extended X-ray absorption fine structure (EXAFS) analysis. The k-space data does not show the atomic bonds directly, but the oscillation thereof changes sensitively based on a bond change around the cerium atom, thus a change of a local atomic structure around the atom (an array of microscopic atoms) may be checked.

With reference to FIG. 9, R-space data Fourier transforms the oscillation of the k-space using a software such that it may be directly seen that how far the atoms are bonded around the actual cerium atom. It may be seen that local atomic structure of the crystalline cerium oxide such as the comparative oxide 3 and the sample 1 according to the present disclosure have greatly changed through the R-space data. Further, an occurrence of severe noises in the k-space is a characteristic of an amorphous material. It may be seen that the noise occurs severely in the k-space in a case of the sample 1.

Peaks shown in the R-space respectively show bonds between Ce—O, Ce—Ti, and Ce—Ce/Zr. Distances at which these bonds are formed may be determined from values in X-axis. In case of the sample 1, which is amorphous, the Ce—Ti bond is formed, which means that a strong bond with Ti, which is input together was formed. Further, it may be seen that the Ce—Ce bond in the sample 1 corresponding to a second peak in the comparative oxide 3 is amorphized, and decreases greatly. This phenomenon occurs as a regularity for a long-range decreases, and may be seen as crucial data that may indicate that a compound is amorphized.

Figure 10:
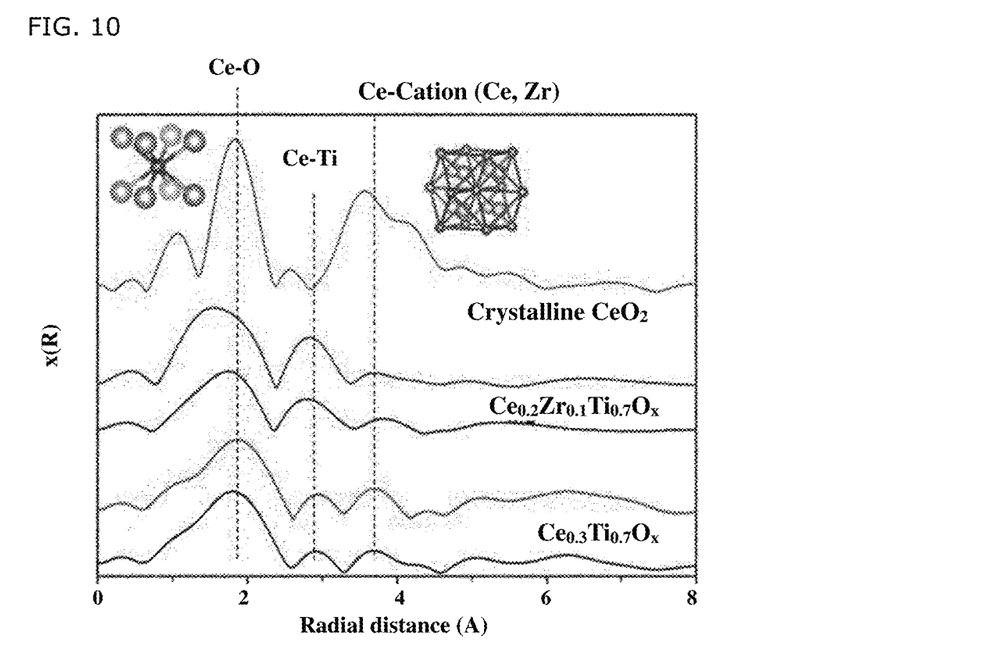
FIG. 10 is a graph showing R-space data of Extended X-ray absorption fine structures (EXAFSs) of various compounds.

FIG. 10 is a graph showing R-space data of Extended X-ray absorption fine structures (EXAFSs) of various compounds.

With reference to FIG. 10 together with FIG. 9, comparing the R-space data of the EXAFS of $Ce_{0.3}Ti_{0.7}O_x$ powder with the sample 1 and the comparative oxide 3, It may be confirmed that an actual amorphization tendency is in an order of comparative oxide 3 ($CeO_2$) <$Ce_{0.3}Ti_{0.7}O_x$<sample 1 ($Ce_{0.2}Zr_{0.1}Ti_{0.7}O_x$). Further, it may be confirmed that the Ce—Ti peak ($Ce_{0.2}Zr_{0.1}Ti_{0.7}O_x$) is strong and the Ce-Cation peak is the weakest in the sample 1, which is consistent with the amorphization tendency.

Although the present disclosure has been described in reference with a preferred embodiment, it will be understood that various modifications, and alterations may be made to the present disclosure by those skilled in the art without departing from the spirit and scope of the present disclosure as defined in the appended claims.

The invention claimed is:

1. A method for producing an amorphous complex metal oxide, the method comprising:
    preparing a titanium precursor solution by mixing titanium isopropoxide and ethanol to produce a titanium containing nucleus;
    subsequently adding a cerium precursor and a zirconium precursor into the titanium precursor solution comprising the titanium containing nucleus to form a complex metal precursor solution comprising the cerium precursor and the zirconium precursor dispersed on the surface of the titanium containing nucleus;
    adding an alkaline solution to the complex metal precursor solution to form a product via a reaction between the complex metal precursor solution and the alkaline solution; and
    heat-treating the product at 500° C. to 600° C. to form an amorphous three-components metal oxide containing titanium (Ti), cerium (Ce), and zirconium (Zr), wherein Ti, Ce, and Zr in the formed metal oxide are uniformly distributed in an amorphous phase.

2. The method of claim 1, wherein the addition of the alkaline solution includes adding the alkaline solution to adjust an acidity (pH) of the complex metal oxide precursor solution to 9 to 11.

3. The method of claim 1, further comprising drying the product at 70° C. to 90° C. before the heat-treatment of the product at 500° C. to 600° C.

4. An amorphous complex metal oxide including the three-components metal oxide containing titanium (Ti), cerium (Ce), and zirconium (Zr) produced according to claim 1, wherein the three-components metal oxide is amorphous.

* * * * *